Dec. 16, 1924.
A. L. ROBB
LUBRICATING DEVICE
Filed March 28, 1922    2 Sheets-Sheet 1
1,519,706
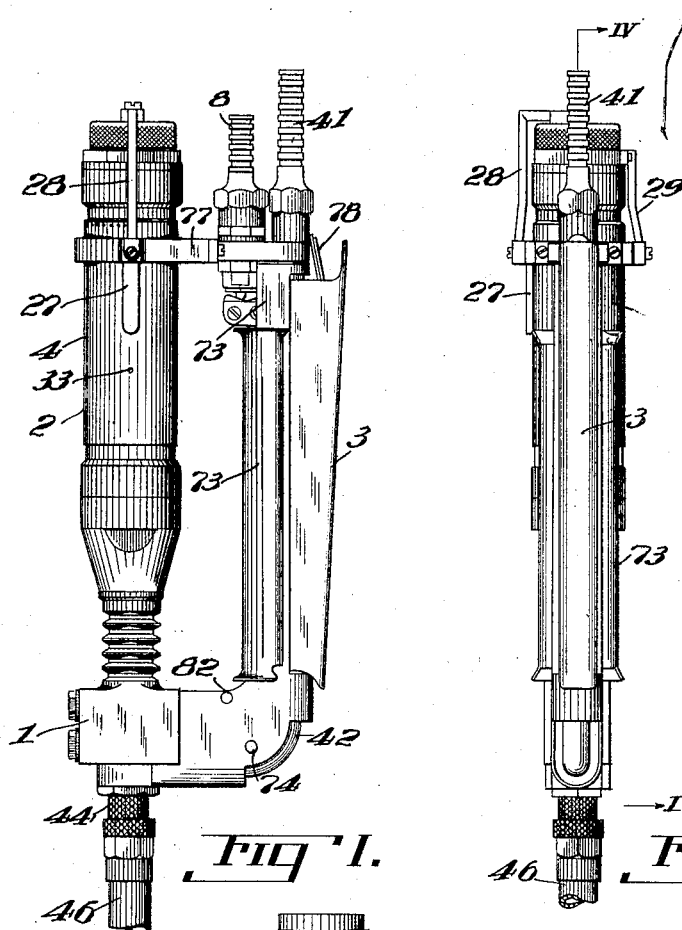
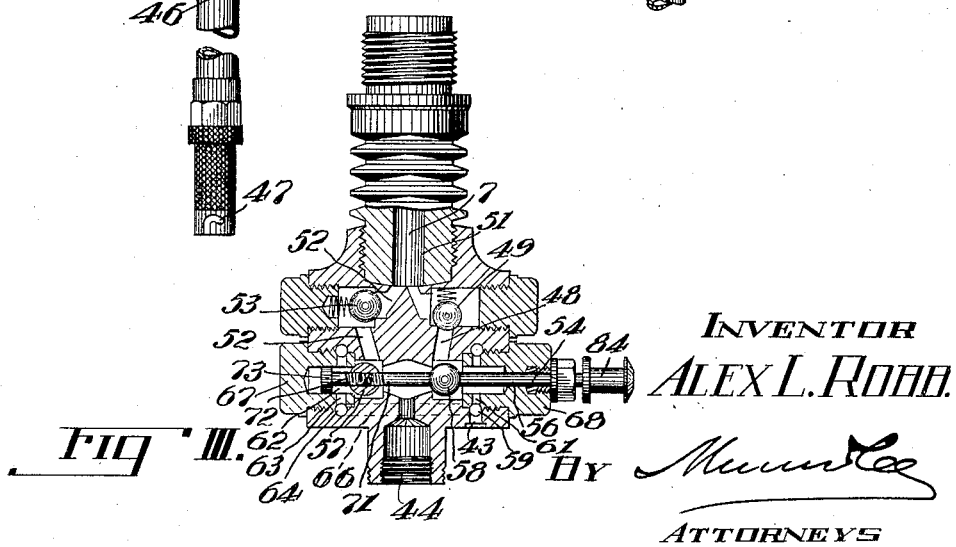
INVENTOR
ALEX L. ROBB.
BY
ATTORNEYS Dec. 16, 1924.
A. L. ROBB
1,519,706
LUBRICATING DEVICE
Filed March 28, 1922    2 Sheets-Sheet 2
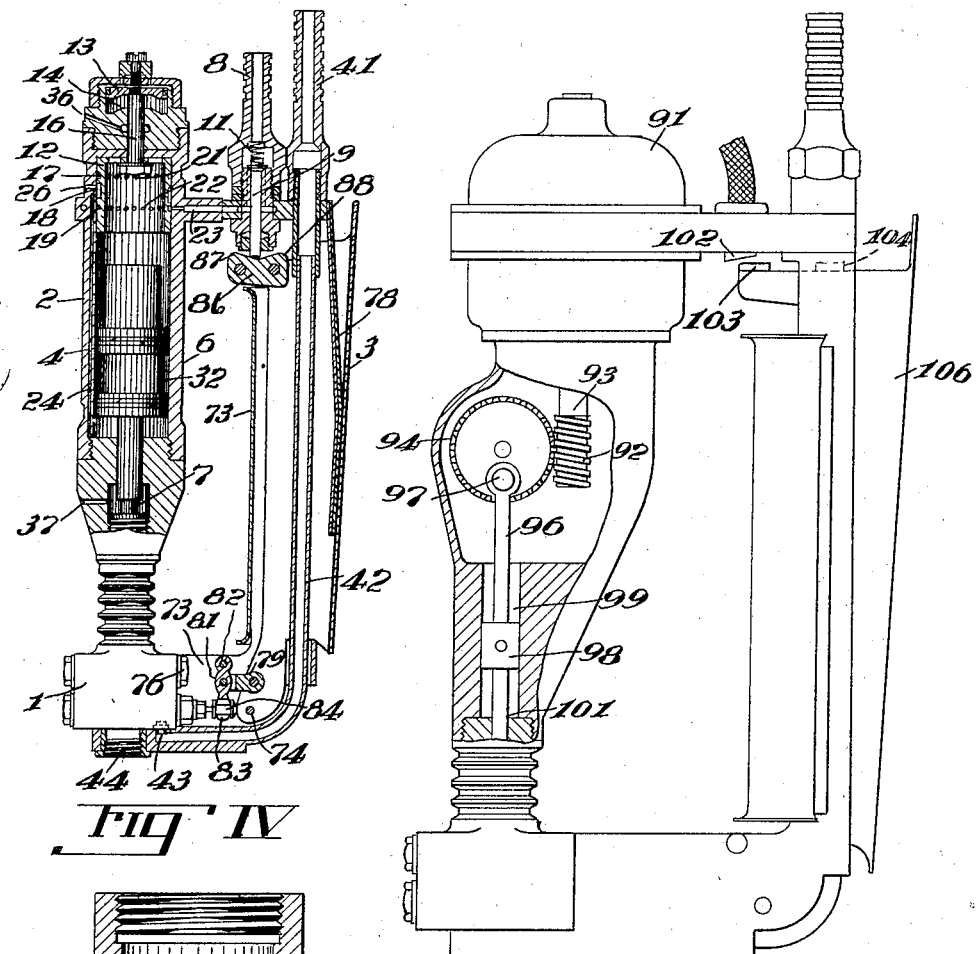
Fig. IV
Fig. VI
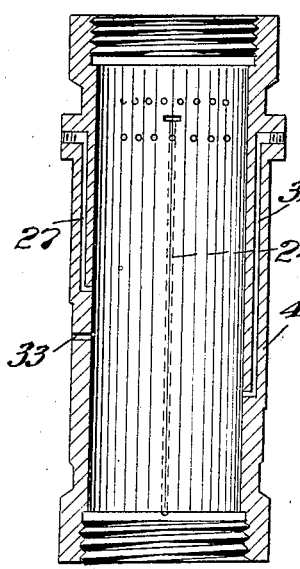
Fig. V
INVENTOR
ALEX L. ROBB.
BY
ATTORNEYS Patented Dec. 16, 1924.

1,519,706

UNITED STATES PATENT OFFICE.

ALEX L. ROBB, OF FRESNO, CALIFORNIA, ASSIGNOR OF ONE-FOURTH TO OLLIE D. CARTER AND ONE-FOURTH TO CLARENCE H. SPEKKER, BOTH OF FRESNO, CALIFORNIA.

LUBRICATING DEVICE.

Application filed March 28, 1922. Serial No. 547,588.

*To all whom it may concern:*

Be it known that I, ALEX L. ROBB, a citizen of the Dominion of Canada, and a resident of Fresno, county of Fresno, and State of California, have invented a new and useful Lubricating Device, of which the following is a specification.

The present invention relates to improvements in lubricating devices and has particular reference to power driven devices of the character described such as are now frequently used in garages for effecting a quick and efficient lubrication of the various bearings in a motor vehicle. The principal object of the present invention is to provide a power driven lubricating device that is light in its structure, can be conveniently carried about and still furnishes an enormous pressure if such is desired. Lubricating devices of similar character have been used before, but mine provides certain features which render the same more efficient and increase its availability for different purposes. A special feature of my device is its ease of operation especially so far as it provides means for relieving the pressure as soon as the greasing operation is performed, which means automatically cause a reversal of the pumping action whereby the connecting end of the grease carrying tube is cleared of grease and wasting of the same prevented. The portability of the device allows of the use of a short hose or other flexible connection between the device and the bearing which decreases the danger of the hose breaking down under the high pressure frequently required for effective lubrication. My device also provides for the application of a variable pressure in accordance with the needs of the bearing to be lubricated.

The preferred form of my invention is illustrated in the accompanying drawing, in which Figure 1 shows a side elevation of my device; Figure 2 a side elevation taken at right angles to the first view; Figure 3 an enlarged cross sectional detail view through my pump; Figure 4 a section through the device along lines 4—4 of Figure 2; Figure 5 a detail sectional view of a cylinder used in my device taken at right angles to that shown in Figure 4, and Figure 6 a side elevation partly shown in section of a modified form of my device. While I have shown only the preferred forms of my invention, I wish to have it understood that various changes or modifications may be made within the scope of the claims hereto attached without departing from the spirit of the invention.

My device comprises in its essential features the pump (1), the power plant (2) and manual control means (3) for pump and power plant.

The power plant as shown in the main form is driven by air pressure. A cylinder (4) has a piston (6) reciprocably secured therein which is adapted to drive the plunger (7) of considerably smaller cross section. Compressed air is alternately admitted on opposite sides of the piston (6) from a source of supply not shown in the drawing, through the pipe (8) controlled by the valve (9) normally seated by the spring (11). The air supply is regulated by the valve (12) comprising in its essential features a sleeve adapted to be reciprocated in the cylinder (4) by means of an auxiliary piston (13) reciprocating in an auxiliary chamber (14) and connected with the valve (12) through a shaft (16). The sleeve or valve (12) is provided with three annular recesses (17), (18) and (19) disposed in the outer periphery of the sleeve in spaced relation to each other, the central recess (18) being wider than the outer recesses (17) and (19). The latter two recesses are connected with the interior of the sleeve by means of a plurality of perforations (21) and (22). This valve operates as follows:

As shown in Figure 4 it occupies its uppermost position and its lower recess (19) registers with a port (23) connecting with the air intake pipe (8). In this position compressed air is admitted through the pipe (8), the port (23), the recess (19) and the perforations (22), into the interior of the cylinder and forces the piston (6) downwardly, the air underneath the piston being allowed to escape through the passage (24) in the wall of the cylinder into the central recess (18) which at that time registers with a port (26) leading to the outside of the cylinder. When the downward stroke of the piston is completed the valve is moved downwardly so that now its recess (18)

registers with the air inlet (23) while losing its connection with the exhaust port (26) but maintaining its connection with the passage (24) in the wall of the cylinder. Simultaneously the recess (17) has descended to a point where it registers with the exhaust port (26). The air now enters through the passage (23) into the recess (18) and through the passage (24) to the underside of the piston, while the air above the piston is simultaneously allowed to escape through the perforations (21), the recess (17) and the exhaust port (26).

The same air actuating the piston controls the auxiliary piston (13) actuating the valve (12) in the following manner: (see Figure 5). As the piston approaches its lowermost position it uncovers a passage (27) in the cylinder wall which connects through the tube (28) with the upper end of the auxiliary piston chamber (14) thus forcing the auxiliary piston (13) and with it the valve (12) downwardly. The air underneath the said auxiliary piston is at the same time allowed to escape through a tube (29) connecting with a passage (31) in the wall of the cylinder, which latter leads to the inside of the same at a place covered at that time by a wide recess (32) in the outer part of the piston (6), so that the exhaust air is allowed to enter this recess and to escape to the outside of the cylinder through a port (33), which at all times registers with the wide recess (32). As the piston approaches its uppermost position it clears the interior opening of the passage (31) and compressed air is forced through said passage and the tube (29) underneath the auxiliary piston (13), while the air above the same is simultaneously allowed to escape through the tube (28), the passage (27), the recess (32) in the piston and the exhaust port (33). A suitable vent (36) allows any leakage air to escape from around the shaft (16) which otherwise might interfere with the successful operation of the auxiliary piston (13). Another vent (37) in the lower portion of the cylinder allows leakage air to escape from around the plunger (7).

The pump (1) receives its lubricant through the hose connection (41) and the tube (42). The lubricant comes from any suitable source of supply and is preferably kept under pressure sufficient to feed the same to the port (43) at the end of the tube (42). The pump normally discharges through the port (44) into a hose or other suitable flexible connection (46), the free end of which is secured in any suitable manner, as by the bayonet joint (47) to the bearing to be lubricated. The plunger (7) draws the lubricant from the port (43) through the suction passage (48) and the check valve (49) into the casing (51) and expels the same on its power stroke through the discharge passage (52) and the check valve (53) into the discharge port (44). This action is, however, adapted to be reversed owing to the fact that a reversing valve (54) is introduced into the system. The latter valve crosses the paths of the suction and the discharge passages (48) and (52) and comprises a valve stem (56) having two preferably ball shaped valve heads (57) and (58) secured thereon in spaced relation to each other. Each valve head is adapted to co-operate with two opposing valve seats so that when the valve stem is in the position shown in Figure 3 one set of seats is engaged by the two valve heads, while when the valve stem is forced to the right the opposing set of valve seats is engaged. When in the position shown in Figure 3 the valves do not interfere with the normal operation of the pump and the lubricant is allowed to enter through the port (43) into an annular recess (59), and through radial passages (61), past the valve (58) into the suction passage (48), and can be forced through the discharge passage (52) past the valve (57) into the discharge (44). But when the valve stem (56) is pushed to the right the opposing set of valve seats is engaged and the suction stroke of the plunger (7) will now draw on the discharge port (44) from which the lubricant will be drawn past the valve (58) into the suction passage (48), and past the valve (49) into the plunger casing (51), while on the power stroke it will be forced through the discharge passage (52) past the valve (53) into the cylindrical space (62), from which it passes through the radial passages (63) into the annular recess (64), which connects, through the communication (66), with the inlet port (43) so that the action of the pump is then reversed.

It will be clear from the above that there are provided a feed passage thru which lubricant noramlly flows to the pump chamber, and a discharge passage thru which the lubricant is forced from the pump chamber by the descending plunger 7; and that these passages are connected by two separate by-passages. With the valves in the position shown in Fig. 3, that is, closing both by-passages and leaving the feed and discharge passages open, normal discharge of the lubricant under pressure occurs. With movement of the valve heads 57 and 58 to their opposite extreme, that is, to close both feed and discharge passages and leaving the by-passages open, the flow of lubricant thru the feed and discharge passages is reversed and the lubricant is then pumped out of the connections and returned to the supply.

As particular structural features I might mention that the valve construction can be easily taken apart due to the fact that it is supported in two opposing plugs (67) and (68) and that the valve head (57) is threadedly secured to the end of the valve stem, as shown at (71), so that the body portion of the valve can be withdrawn with the plug (68) while its end can be withdrawn with the plug (67). To lock the valve head (57) to the valve stem I provide an opposing threaded member (72) which is provided with a cylindrical head (73) adapted to slidably engage the cylindrical chamber (62), thereby furnishing a guide for the valve stem.

The valve is actuated by the handle (3) pivotally secured in the case (73) in the proximity of the valve, as at (74). The casing (73) is rigidly secured to the pump (1), as at (76), extends sideways from the same through a short distance, then runs parallel to the power plant surrounding the tube (42) and is rigidly secured to the casting (77) containing the passage (23). The handle or grip (3) is normally forced outwardly by a spring (78) and when in that position it pulls the valve (54) outwardly by means of the connecting link (79) engaging a lever (81), pivoted at (82), the free end of which is forked as shown at (83) and engages an annular groove (84) at the end of the valve stem. In this position the pumping action of the device is reversed. When the handle is pressed downwardly over the resistance of the spring (78) the valve (54) is pushed inwardly and sets the pump for normal action.

The handle or grip 3 not only actuates the valve (54) but it simultaneously controls the valve (9) admitting compressed air into the power plant. This control is effected by means of the block (86) at the far end of the handle which is provided with two cams (87) and (88) disposed in spaced relation to each other so as to leave a recess between them. In either of its extreme positions one of the cams opens the valve (9) so that compressed air is admitted, but while the handle is moved from one position to the other the recess between the two cams allows the valve (9) to close and to thus render the power plant inactive while the change is effected. It will be remembered that this change of the handle from one extreme position to the other effects a reversal of the pumping action, so that as a result of the cam arrangement the power plant is inactive while the reversal is effected.

The operation of my device should be readily understood from the foregoing description. It should be remembered that compressed air is admitted to the power plant through the pipe (8) and that its supply is controlled by the two cams (87), and 88, that the lubricant is admitted under slight pressure through the hose connection (41) and the tube (42), that the pump action may be reversed by means of the valve (54), and that both the latter valve and the valve (9) are simultaneously controlled by the handle (3) so that the whole device is subject to the control of the operator by means of a slight pressure with his hand.

To stop the action of the power plant and of the pump altogether, the operator holds the handle in a middle position as shown in Fig. 4, until his device is disconnected.

In Figure 6 is shown the same device operated by an electric motor instead of by air pressure. The motor (91) is provided with a worm (92) on its shaft (93), which worm engages a worm gear (94) actuating a connecting rod (96) secured to the gear wheel by means of the pin (97). The connecting rod drives the piston (98) and causes the same to reciprocate in the cylinder (99). The plunger (101) is actuated by the piston (98) in the same manner as in the device previously described, and this plunger performs the same function as the plunger (7) of the air driven pump. A stationary contact (102) takes the place of the valve stem (9) and the cams (87) and (88) are replaced by two contacts (103) and (104) secured to the handle (106) in spaced relation to each other. It will be seen that by this arrangement the same results are obtained as in the previous example, that is, when the handle is pressed downwardly firmly the contact (104) will engage the contact (102) and will cause the pump to force a lubricant into the bearing to be lubricated. When sufficient lubricant is admitted, the operator releases the handle and while doing so the action of the pump is reversed in the manner previously described, while the power plant is rendered inactive until the second contact (103) engages the contact (102) when the motor will again drive the pump with reversed results.

I claim:

1. A power driven pump of the character described having means associated therewith for reversing its action, actuating means for the reversing mechanism, and means associated with said actuating means for disconnecting the power while the reversal is effected.

2. A power driven pump of the character described having means associated therewith for reversing its action, a spring-pressed grip for operating the reversing mechanism, and means associated with said grip for disconnecting the power while the reversal is effected.

3. In a lubricating device, a single acting pump including a suction passage for the feeding of the lubricant to the pump and a delivery passage for the discharge of lubricant from the pump, means for reversing the flow of lubricant thru said passages, means for controlling the application of energy to the pump, and means for the unitary operation of said reversing means and said energy controlling means.

4. In a lubricating device, a pump including a suction passage for the feeding of lubricant to the pump and a delivery passage for the discharge of lubricant from the pump, means in said passages for reversing the flow of lubricant thru said passages, means for controlling the application of energy to the pump, and means for the unitary operation of said reversing means and said energy controlling means including means for automatically interrupting the application of energy to the pump during the said reversal of flow.

5. In a lubricating device, a fluid pressure operated pump including a suction passage for the feeding of lubricant to the pump and a delivery passage for the discharge of lubricant from the pump, valve means arranged in said passages for reversing the flow of lubricant therethru, a valve for controlling the application of pressure fluid to said pump, a pivoted grip, means connecting the grip with said valve means so that in one extreme position of the grip said valve means effects the normal flow of lubricant thru said passages, a spring for pressing the grip to the other extreme position so as to move said valve means to reverse the normal flow of lubricant and a cam on said grip for effecting the opening in both extreme positions of the grip said pressure fluid controlling valve and the closing thereof in the middle position of the grip.

6. A lubricating device comprising a cylinder, a pump plunger in said cylinder, fluid pressure operated means for reciprocating said plunger, a passage for the feeding of lubricant to said cylinder, a passage for the discharge of lubricant from said cylinder, a by-passage connecting said feed and discharge passages, a second by-passage connecting said feed and discharge passages, unitary valve mechanism for selectively closing both by-passages and leaving said feed and discharge passages open or for closing said feed and discharge passages and leaving said by-passages open whereby the flow of lubricant thru said passages may be reversed.

7. In a lubricating device, a pump including a suction passage for the feeding of lubricant to the pump and a delivery passage for the discharge of lubricant from the pump, a by-passage connecting said feed and discharge passages, a second by-passage connecting said feed and discharge passages, unitary valve mechanism for selectively closing both by-passages and leaving said feed and discharge passages open or for closing said feed and discharge passages and leaving said by-passages open whereby the flow of lubricant thru said passages may be reversed.

ALEX L. ROBB.